April 22, 1930.  E. FLOOR ET AL  1,755,290
SHOCK ABSORBER
Filed July 5, 1927   2 Sheets-Sheet 1

April 22, 1930.   E. FLOOR ET AL   1,755,290
SHOCK ABSORBER
Filed July 5, 1927   2 Sheets-Sheet 2

Inventors:
Eric Floor
Ejnar Sejersen
Williams, Bradbury,
McCaleb + Hinkle
Attys.

Patented Apr. 22, 1930

1,755,290

UNITED STATES PATENT OFFICE

ERIK FLOOR AND EJNAR SEJERSEN, OF CHICAGO, ILLINOIS

SHOCK ABSORBER

Application filed July 5, 1927. Serial No. 203,308.

The present invention relates to shock absorbers for vehicles and other uses and is more particularly concerned with the provision of a novel shock absorber piston and cylinder.

One of the objects of our invention is the provision of a shock absorbing element which is adapted to permit relatively free movement of the vehicle relative to its axle when such motion is slow but which presents to shocks, jolts, or other relatively quick movements between these parts, a resistance which depends upon the severity of the shock and which is controlled by the combined effects of inertia and fluid pressure.

Another object of our invention is the provision of a shock absorber piston and cylinder including a piston resiliently supported upon a piston rod, said piston having ports and said piston rod having valves actuated when said piston lags behind said piston rod in such manner that the shock absorbing action is controlled both by the inertia of the piston and by the building up of pressure upon the piston depending upon the relative speed and severity of the shock and the adjustment of the shock absorber parts.

Another object of our invention is the provision of a shock absorber piston and cylinder in which the parts most likely to be subjected to wear may be constructed with a clearance, the resistance being provided by the passage of a fluid through said clearance and other ports so that the structure of the shock absorber may be simplified although the device is more efficient in opertion, more durable, more easily adjusted and more economical than the devices of the prior art.

Another object of our invention is the provision of a shock absorbing element controlled by the effects of inertia and fluid pressure, including means for adjustment of the relative effect of the inertia of the piston and the effect of the fluid pressure built up in the element by relatively quick and continued motion of the piston in either direction or both directions.

Other objects and advantages of our invention will appear more fully from the following description and from the accompanying drawings in which similar characters of reference indicate similar parts throughout the several views.

Referring to the drawings, Fig. 1 is a side elevational view showing our shock absorber applied to a vehicle.

Fig. 4 is a cross-sectional view taken on the lines 4—4 of Fig. 2.

Fig. 5 is a view of a modified form of piston in partial cross section.

Figure 1:
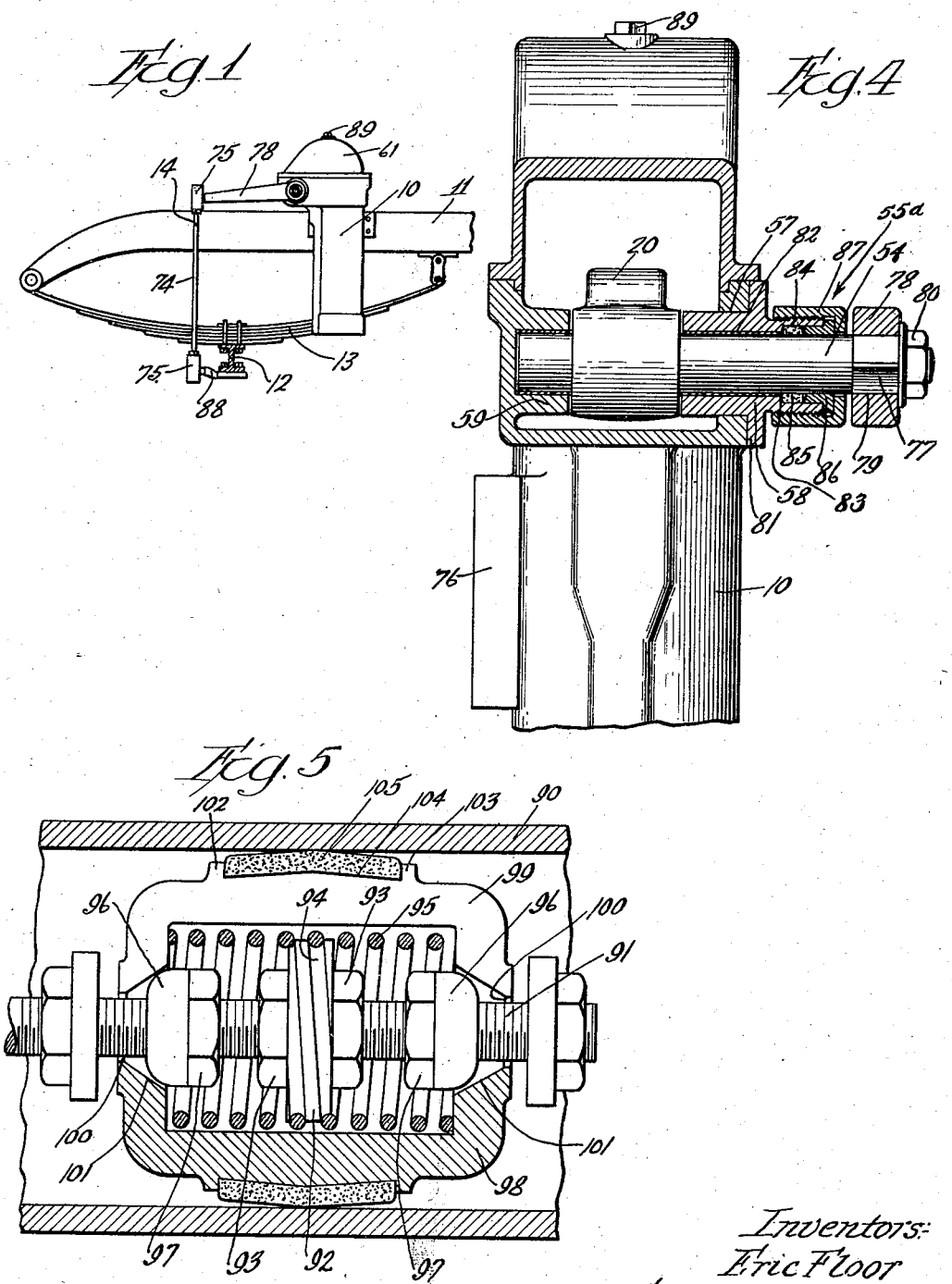
Figures 2, 3:
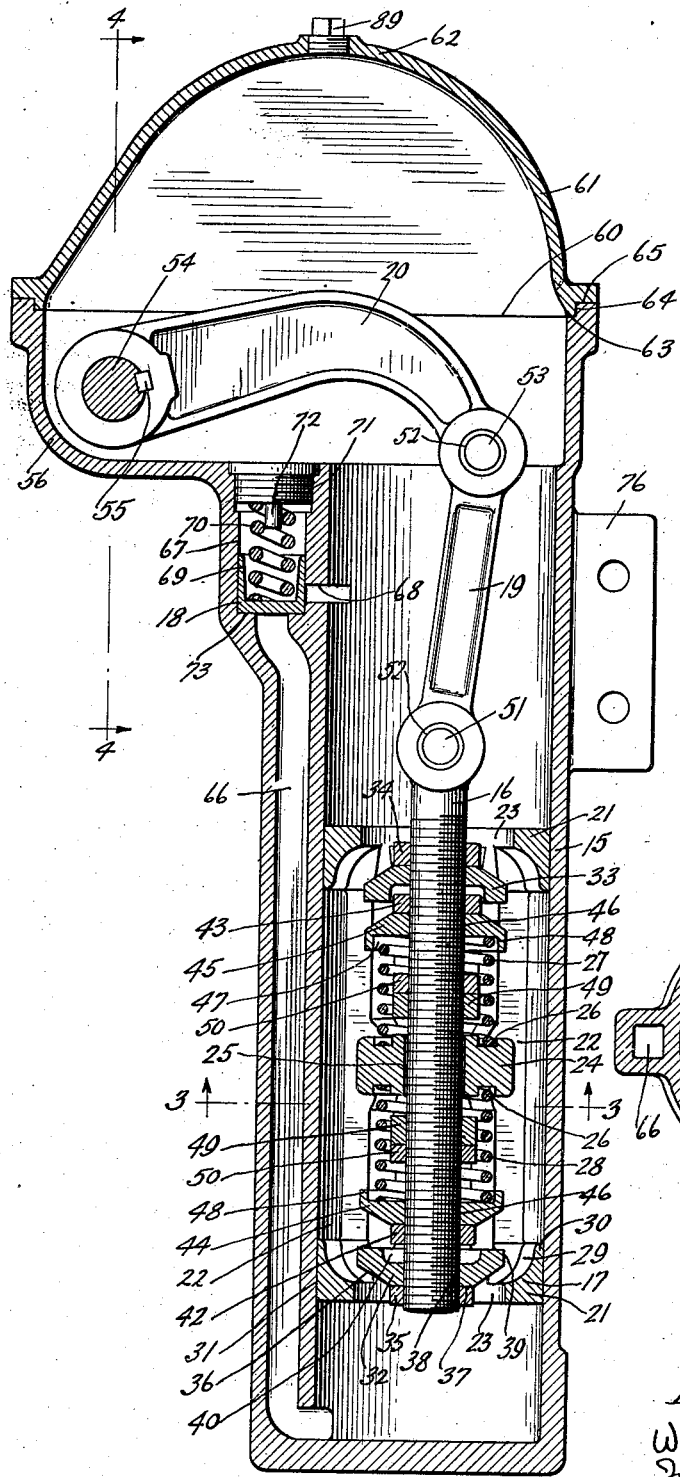
Fig. 2 is a medial elevational cross-sectional view of the shock absorber cylinder and piston.
Fig. 3 is a cross-sectional plan view taken on the lines 3—3 of Fig. 2.

Referring to Figs. 1 and 2, 10 indicates in its entirety our shock absorbing element, 11 indicates the chassis of a vehicle to which it is applied, 12 indicates an axle or other unsprung part of a vehicle, and 13 indicates a spring of any type connected in the usual manner between the chassis and axle. The shock absorbing element 10 may be supported upon the axle or chassis, preferably the latter, and 14 indicates in its entirety the connecting mechanism between the shock absorbing element 10 and axle 12.

Referring to Fig. 2, our shock absorbing element 10 comprises a receptacle or cylinder 15, an actuating element or piston rod 16 and a pressure actuated element or piston 17, resiliently supported upon said actuating element. The shock absorbing element may also include a safety valve 18 and the necessary connecting levers 19 and 20 for actuating the same.

While we shall employ the terms "piston" and "cylinder" in the description of our shock absorbing element, we desire to be understood that these elements may be constructed otherwise than cylindrical. For instance, the receptacle might be substantially square in cross section, being used with a piston of the same cross section adapted to reciprocate therein. The terms "cylinder" and "piston", therefore, wherever they are employed throughout the specification and in the claims, are used in a generic sense, including equivalent elements, whatever their cross section may be.

The cylinder 15 may comprise a cast metal member, preferably of cylindrical shape for convenience in construction, and adapted to receive the piston 17, also of cylindrical exterior shape and adapted to reciprocate in the cylinder.

The piston 17 may consist of a cast metal member formed with a ring 21 at each end, the rings 21 being connected together by a plurality of longitudinal webs 22. The rings 21 are formed with apertures or ports 23, preferably centrally located therein, and the interior of the piston 17 may be hollow, the piston consisting primarily of the rings 21, webs 22 and a collar 24.

The collar 24 may be cast integrally with the balance of the piston 17, being supported midway between the rings 21 upon the webs 22 and being formed with a central bore 25 adapted to receive the piston rod 16 with the necessary clearance to avoid injury to the threads. The collar 24 may also be formed with means for supporting one or more springs comprising a pair of annular grooves 26 in which the springs 27 and 28 may be received. In addition to supporting the collar 24 and rings 21, the webs 22 provide smooth guides for the valves 32 and 33, described in detail hereinafter.

The rings 21 may be formed with an interior rounded surface 29 tapering from the ports 23 toward the inside edges 30 of the rings, and the exterior surface 31 of the rings 21 may be substantially cylindrical. However, in the operation of our device we contemplate leakage past the piston 17 at all times. It is not necessary to form the piston 17 or its rings 21 to fit the cylinder 15 very closely. Any variation in the clearance between the piston and cylinder can readily be taken care of by adjustment of the valves 32 and 33, further to be described.

The piston rod 16 is preferably threaded throughout its length within the piston 21 and the piston rod 16 supports a pair of valves 32 and 33. By threading the valves 32 and 33 upon the piston rod 16 and providing lock nuts 34 and 35, these valves are readily adjusted upon the piston rod to vary the amount of opening between each valve and its ring 21 and to vary the effects produced, as will be further described.

The valves 32 and 33 may be flat but are preferably made with an exterior surface 36 like the frustum of a cone, having its upper surface 37 flattened about its threaded bore 38 in order to be engaged by the lock nut 34 or 35.

The outer edge 39 of the valves may be made substantially cylindrical and the valve should preferably be of such size that it will slide within the webs or guides 22, just clearing the ports 23, closing either of said ports.

In order to save space for adjustment upon the piston rod, the interior 40 of the valves 32 and 33 may be hollowed out sufficiently to receive the lock nuts 42 and 43 employed with the collars 44 and 45.

The collars 44 and 45 comprise cup-shaped metal members having a central threaded bore 46 by means of which the collars may be supported and adjusted upon the piston rod 16. The shape of the collars 44 and 45 may be somewhat similar to that of the valves 32 and 33 except that the interior 47 is made slightly larger to accommodate the springs 27 and 28. The annular walls 48 upon the collars 44 and 45 are adapted to retain the springs 27 and 28 in the position shown in Fig. 2.

The springs 27 and 28 comprise helical springs of resilient metal of sufficient size to be received in the annular grooves 26 of the collar 24 and in the cup-shaped aperture 47 of the collars 44 and 45. The springs 27 and 28 are compressed against the collar or support 24 by the collars 44 and 45, the latter being retained in adjusted position by their lock nuts 42 and 43. It will thus be observed that the piston rod 16 is adapted to reciprocate relative to the piston 17 by compressing one or the other of the springs 27 and 28 and the piston 17 is resiliently supported upon the piston rod 16. Such relative motion between the piston rod 16 and the piston 17 must also result in varying the size of the aperture between one of the valves 32 or 33 and its port 23. The complete operation of these parts will be described hereinafter.

In order to limit the movement of the valves 32 and 33, we provide stop members upon either or both sides of the collar 24. These stop members may consist of a pair of nuts 49, one threaded upon the rod 16 on each side of the collar 24, each nut 49 being provided with a lock nut 50 to retain it in adjusted position. It will thus be observed that, as the piston rod 16 and valve 33 move upward to close the upper aperture 23, this motion, relative to the piston 17 and its collar 24, will be limited by the stop or nut 49 hitting the collar 24, while the motion of this valve in the opposite direction will be limited by the stop 49 on the opposite side of the collar 24.

The novel piston and cylinder so far described may be employed with any actuating mechanism and a piston rod may be extended through an ordinary bushing or packing adapted to provide a fluid tight joint about a reciprocating rod. However, we prefer to employ such connecting mechanism that the moving part projecting from the cylinder casing has a rotary movement instead of a reciprocating movement so that the packing and associated parts may be made more durable.

The piston rod 16 may be pivotally connected to a connecting link 19 by a pin 51 of any standard construction and having a bushing 52 of antifriction metal. A connecting link 19 may likewise be pivoted to a crank arm 20 by a similar pin 53 having a similar bushing 52.

The crank arm 20 may be keyed to a shaft 54 by a key and key-way 55 and the shaft 54 may extend from the cylinder casing as at 55ª for connection to the exterior connecting mechanism 14. In order to enclose the foregoing mechanism, the cylinder 15 may be provided with an enlargement 56 at its upper end, having an aperture 57 in one side to receive a bearing 58 and having another bearing 59 cast integrally in the opposite side.

The top of the cylinder 15 may be formed with an aperture 60 and the aperture 60 may be closed with a cover 61 outwardly curved as at 62 to provide sufficient room for the movement of the crank 20. The joint between the cover 61 and the cylinder 15 may be formed with a plurality of surfaces 63, 64 and 65 at right angles to each other in order to provide a fluid tight joint; and the cap 61 may be bolted or otherwise secured to the cylinder 15.

The cylinder 15 may also be provided with a conduit 66 extending from below the piston 17 to a bore 67 opening above said piston. The bore 67 and conduit 66 may also communicate with a port 68 opening above the piston 17 and the bore 67 is provided with a valve 69. The bore 67 and valve 69 may be of larger size than the conduit 66, thereby providing a stop or shoulder 73 against which the valve 69 may rest, closing the port 68.

The valve 69 may be of substantially cup shape, adapted to receive a compression spring 70 of considerable strength, and the spring 70 may be compressed against the valve 69 by a screw plug 71 threaded at the upper end of the bore 67. The plug 71 may also have a central pin 72 to retain the spring 70 in place.

The purpose of the safety valve 18 is to prevent breakage of the mechanism composing the shock absorber under abnormal conditions when the wheels of the vehicle strike an unusually large obstruction, and the strength of the spring 70 should be such as to permit the valve 69 to be lifted, opening the port 68 at some point just before the critical point at which the mechanism would break.

The connecting mechanism 14 may comprise a connecting rod 74 having ball and socket connections 75 at each end. The shock absorber cylinder 15 may be secured to the chassis 11 by a plurality of bolts passing through an integral bracket 76 on the cylinder casing. The shaft 54 may be squared and tapered at its outer end 77, being adapted to receive a crank arm 78 having a square aperture 79.

The crank arm 78 may be retained upon the shaft by a nut 80 and a conventional washer. The bearing 58 for the shaft 54 may be provided with an annular attaching flange 81 and the bearing may be secured in the bore 57 by a plurality of bolts or other fastening means. The bearing 58 is provided with a central aperture 82 adapted to fit the shaft 54 quite closely and with a counterbore 83 adapted to receive the packing of asbestos or other material.

The bearing 58 is also provided with a gland 86 adapted to reciprocate in the counterbore 84 compressing the packing 85, and with a cap 87 threaded on the bearing 58 to compress the gland and packing. The opposed surfaces of the gland 86 and counterbore 84 may be beveled as shown to compress the packing against the shaft 54.

The crank arm 78 is connected to the connecting rod 74 by its upper universal joint 75 and the lower end of the connecting rod 74 is attached to the axle 12 by means of a bracket 88 which forms a part of the universal joint 75.

While the cylinder 15 may be operated with any fluid or any gas, in order to reduce the size of the shock absorber and increase the amount of possible clearance between the parts, we prefer to use a relatively non-compressible liquid, such as glycerine, and the cap 62 may be provided with a screw plug 89 for the purpose of completely filling the cylinder casing 15 and cap 61 with liquid.

From the foregoing description, it is thought that the assembly of these parts will be obvious to one skilled in the art. The operation of our invention is as follows:

When the vehicle strikes a bump or other irregularity in the road and the axle 12 approaches the chassis 11, the crank 78 will be rotated in a clockwise direction in Fig. 1, by the connecting rod 74, rotating the shaft 54 and the crank 20. The piston rod 16, being connected to the crank 20 by the link 19, will naturally follow the movements of said crank, tending to move the piston 17 which is resiliently supported upon the piston rod 16.

During the first movement of the piston rod downward, which we shall call the bound of the spring, the fluid below the piston will pass through the port 23 at the lower end of the piston, through the hollow portions of the piston, and out the upper port 23. During this motion, pressure will be generated in the space below the piston, such pressure reacting against the lower surface of the piston ring 21 and tending to cause the piston 17 to lag behind the motion of the rod 16, which it may do since the piston is resiliently supported on the rod 16 by the springs 27 and 28. The spring 27 will thus be compressed and the lower port 23 will become slightly closed, while the upper port 23 will be opened further. It will thus be evident that when pressure is generated in the space below the piston, this pressure tends to close the lower port 23 increasing the restriction, which, in turn, increases the pressure, resulting in greater restriction until the movement of the piston is limited by the stop 49 above the collar 24.

In any event, the effect of the generation of pressure is cumulative so that the shock absorber tends to check the bound of the vehicle in the shortest possible time. In a similar manner, upon the rebound of the spring 13 downward, the cranks 78 and 20 will rotate counterclockwise, lifting the piston rod 16 and tending to compress the fluid above the piston 17. Under certain conditions, the same results previously described may take place in order to check the rebound of the spring.

It will also be observed that the effect of any motion of the piston rod upon the piston 17 may be governed by the adjustment of the tension of the springs 27 and 28, and these springs may be so adjusted that, for small irregularities in the road-bed, they are so strong that the slight pressure generated below and above the piston 17 is not sufficient to cause the closing of the ports 23. Thus, under ordinary conditions, the shocks may be taken care of by the springs 13, the shock absorber serving merely to slightly dampen the movement of the springs, due to the friction caused by the movement of the fluid through the piston.

As the pressure generated above and below the piston depends upon the speed with which the piston moves, it will be evident that, upon relatively quick movements of the piston rod 16, a relatively great pressure will be produced and the piston will compress one or other of the springs, tending to close one or other of the ports and to check the movement.

It should also be noted that the relative amount of restriction at either of the ports 23 may be governed in part by the effect of inertia of the piston 17 whenever the piston rod 16 is accelerated. Under such conditions, the piston 17, if constructed with considerable mass, will tend to preserve its state of rest or uniform motion, lagging behind the piston rod 16 and compressing one or other of the springs 27 and 28. This inertia effect will also tend to close one or other of the ports 23, thereby increasing the restriction and tending to build up a pressure at the corresponding end of the piston 17. The amount of this pressure and the checking effect of the shock absorber may depend upon both the inertia of the piston and upon the building up of the pressure due to the motion of the piston.

We desire to be understood, however, that the strength of the springs 27 and 28 may be made sufficient and the mass of the piston sufficiently small so that the effects of inertia may be eliminated, if desired. The wide range of adjustment provided by the threaded rod 16 is capable of permitting the adjustment of the device to absorb shocks under widely different conditions.

Under certain conditions, it is possible that the downward movement of the chassis 11 might have sufficient momentum to break the shock absorber parts and to prevent this we have provided a one-way valve 18 having a strong spring 70 which is adapted to permit the lifting of the valve 18 to release the pressure below the piston under abnormal conditions when the mechanism might otherwise be broken. This safety valve is ordinarily not required for the rebound of the spring and in fact may be eliminated entirely by providing parts of sufficient strength to withstand the strains.

While we have shown an embodiment which is adapted to check the shock, both on the bound and rebound, we desire to be understood that our device may also be used for checking shocks in but one direction only. For this purpose, one valve may be so adjusted that it will not restrict its port 23 under any conditions.

We do not desire to be limited to the precise construction or location of springs set forth as springs of widely varying shapes may be employed.

Referring to Fig. 5, we have here shown a modified form of shock absorber, comprising a cylinder 90 having a piston rod 91. The piston rod 91 supports a threaded collar 92 by means of a pair of lock nuts 93 and the collar 92 has an enlarged thread 94 upon which a spring 95 may be threaded. The spring is thereby supported in any adjusted position on the piston rod 91.

The piston rod 91 may also support a pair of cams 96 threaded thereon and secured by means of lock nuts 97. The friction mechanism in this embodiment comprises a plurality of segmental members 98 and 99 of substantially U cross section and adapted to fit together to form a substantially cylindrical casing about the spring 95.

There may be any number of the members 98 and 99 but these members are preferably of similar size and shape. The cylindrical casing formed by the members 98 and 99 has an aperture at 100 at each end and camming surfaces 101 extending from said apertures about the cams 96. The camming surfaces 101 are preferably of the shape of a frustum of a cone and as either of the cams 96 moves into its camming surface 101, the segmental shoes 98 and 99 are forced apart into engagement with the cylinder 90.

The segmental shoes 98 and 99 are formed with a pair of annular flanges 102 and 103, defining a groove 104 adapted to receive a band 105 of brake lining or other heat and friction resisting material. It will thus be observed that as the piston rod 91 moves, the segmental shoes 99 may lag behind the piston rod, but said shoes are cammed apart by one of the cams 96 bringing the brake band 105 into engagement with the cylinders and checking the shock.

The other mechanism of the shock absorber may be substantially the same as that previously shown but no fluid need be employed.

It will thus be observed that we have invented a shock absorber in which the shock absorbing effect may be determined by the building up of fluid pressure, due to a restricted opening, and in which the pressure built up tends to increase the restriction. Our shock absorber is also adapted to utilize the effects of inertia of the resiliently supported piston and the wide range of adjustment provided enables the adaptation of our shock absorber to vehicles of widely varying characteristics.

While we have illustrated and described a preferred embodiment of our invention, many modifications may be made without departing from the spirit of the invention, and we do not wish to be limited to the precise details set forth but desire to avail ourselves of all changes within the scope of the appended claims.

Having thus described our invention, what we claim as new and desire to secure by Letters Patent of the United States is:

1. In a shock absorber, the combination of a receptacle with a fluid in said receptacle, an actuating element, an inertia and pressure responsive element resiliently supported on said actuating element for movement through said fluid, and a valve supported on said actuating element for increasing the effective area of said pressure responsive element when the latter lags behind said actuating element.

2. In a shock absorber, the combination of a cylinder with a piston rod, a piston resiliently supported on said piston rod, said piston having a port, a fluid in said cylinder, a valve supported on said piston rod for closing said port and stop means for determining the range of motion of said valve.

3. In a shock absorber, the combination of a cylinder with a piston having a bore through the same, a fluid in said cylinder, a piston rod passing through said bore, a pair of shoulders carried by said piston in said bore, a pair of adjustable collars carried by said piston rod, and a spring tensioned between each shoulder and one of said collars, and valve means carried by said piston rod adjacent each end of said bore.

4. In a shock absorber, the combination of a cylinder with a fluid in said cylinder, a piston rod, a piston in said cylinder, said piston comprising a pair of rings having central ports, and means for connecting said piston rings, spring means supporting said piston on said rod, and conical valves carried by said rod inside each of said ports.

5. In a shock absorber, the combination of a cylinder with a fluid in said cylinder, a piston rod, a piston in said cylinder, said piston comprising a pair of rings having central ports, and means for connecting said piston rings, spring means supporting said piston on said rod, conical valves carried by said rod inside each of said ports, and guide means carried by said piston about said rod.

6. In a shock absorber, the combination of a cylinder with a fluid in said cylinder, a piston rod, a piston in said cylinder, said piston comprising a pair of rings having central ports, and means for connecting said piston rings, spring means supporting said piston on said rod, conical valves carried by said rod inside each of said ports, guide means carried by said piston about said rod, and means for adjusting the tension of said spring means.

7. In a shock absorber, the combination of a cylinder with a fluid in said cylinder, a piston rod, a piston in said cylinder, said piston comprising a pair of rings having central ports, and means for connecting said rings, spring means supporting said piston on said rod, conical valves carried by said rod inside each of said ports, guide means carried by said piston about said rod, means for adjusting the tension of said spring means, and adjustable stop means for said valves.

8. In a shock absorber, the combination of a cylinder, a fluid in said cylinder, a piston in said cylinder, a piston rod, resilient means connecting said piston and rod, valve means carried by said rod and actuated either by increase of pressure on said piston or due to inertia of said piston, and a safety valve for said cylinder adapted to open and permit passage of fluid under abnormal pressure.

In witness whereof, I hereunto subscribe my name this 26th day of June, 1927.

ERIK FLOOR.

In witness whereof, I hereunto subscribe my name this 1st day of July, 1927.

EJNAR SEJERSEN.